United States Patent [19]

Green et al.

[11] 4,009,076

[45] Feb. 22, 1977

[54] ENZYME GRANULES

[75] Inventors: Robin John Green; Michael David Key, both of Wirral, England; Keith William Murray, Mold, Wales

[73] Assignee: Lever Brothers Company, New York, N.Y.

[22] Filed: Nov. 2, 1973

[21] Appl. No.: 412,394

[30] Foreign Application Priority Data

Nov. 3, 1972 United Kingdom ............ 50681/72

[52] U.S. Cl. .................................. 195/63; 195/68; 252/135; 252/DIG. 12

[51] Int. Cl.[2] .......................................... C07G 7/02

[58] Field of Search ............... 195/63, 68, DIG. 11; 252/DIG. 12, 135

[56] References Cited

UNITED STATES PATENTS

| | | | |
|---|---|---|---|
| 3,519,570 | 7/1970 | McCarty | 195/63 X |
| 3,687,717 | 8/1972 | Philip | 195/68 X |
| 3,775,331 | 11/1973 | Borrello | 195/68 X |

*Primary Examiner*—David M. Naff

*Attorney, Agent, or Firm*—Kenneth F. Dusyn; James J. Farrell; Melvin H. Kurtz

[57] ABSTRACT

Enzyme granules, particularly for detergent compositions, are prepared having a granule core of solid material carrying an enzyme and a solid coating of plasticized resin free of the enzyme. The plasticized resin can be dextrin or sodium lignosulphonate containing a plasticizer such as glucose, sucrose urea, glycerol or ethylene glycol. The granules are made by spraying the enzyme-containing core with a concentrated aqueous solution of the plasticized resin.

11 Claims, No Drawings

ENZYME GRANULES

This invention relates to enzyme-containing granules, to processes for preparing them, and to detergent compositions containing them.

Numerous methods have been proposed for incorporating enzymes into detergent compositions, including the provision of the enzyme in granular form in order to avoid the presence of fine particles in the dry composition, and the encapsulation of the granules to protect the enzyme from decomposition. British Pat. No. 1,237,899 describes the improvement of storage stability of granules containing an enzyme and a detergency builder salt, by providing them with a coating of a material which is sufficiently soluble or dispersible in tap water at 20° C, and gives as examples of suitable coating material "non-ionics" and film-forming agents such as shellac. However, both nonionic detergent-active compounds and shellac have disadvantages. Thus nonionic detergent-active compounds are not suitable for use as coating for porous granules because they are either liquid materials which will not give solid coatings, or where they are solid substances there are difficulties in producing continuous cohesive coatings with them without the use of organic solvents. Shellac is only soluble in water under alkaline conditions, so that formation of a coating with it in practice requires the use of an organic solvent because a high pH is unacceptable. The present invention concerns the use of a coating material which can be applied by spraying from aqueous solution at neutral pH without the use of organic solvents, and which readily dissolves in water to release the enzyme when required.

According to the invention, an enzyme granule comprises a granule core of solid material carrying an enzyme, and a solid coating of plasticised resin substantially free of the enzyme, the resin having at 20° C and neutral pH a solubility in water of at least 50% by weight, and a 50% aqueous solution of the resin at 20° C having a viscosity of from 0.1 to 25 poises.

Preferably there is used a resin whose 50% aqueous solution at 20° has a viscosity of from 1 to 15, and especially from 5 to 12 poises, as these are the most easy to use to form the coating by a spraying technique without using large amounts of water which then having to be removed by drying, perhaps with repeated application in order to build up a coating of sufficient thickness.

Particularly suitable as resins for the coating are dextrins and alkali metal lignosulphonates having the physical properties defined above. A suitable dextrin is yellow dextrin, also known as canary dextrin, especially one whose 50% aqueous solution have a viscosity at 20° C of 7 poises. White dextrins having the required properties can also be used. Dextrins are described in Skeist, *Handbook of Adhesives* (Reinhold, 1962). Dextrins are commonly used as binders for agglomerated particles and have been proposed as such in making enzyme granules, for instance as in U.S. Pat. No. 3,650,967. Alkali metal lignosulphonates can be potassium, but are preferably sodium lignosulphonates. Suc materials are described in Brauns and Branuns, *The Chemistry of Lignin* (Academic Press, 1960).

Neither dextrin nor an alkali metal lignosulphonate can be used effectively without a plasticiser. A wide variety of compounds can be used as plasticisers for the resin, but it is necessary to choose a plasticiser and the amount in which it is to be used in relation to the particular resin chosen by carrying out a simple test. In this test a glass slide is dipped into a concentrated aqueous solution of the resin and plasticiser compound to be tested and allowed to dry in air at ambient temperature. If after 2 weeks the resinous film shows no cracks or faults and the film is dry to the touch, the plasticiser is suitable for use with the resin in the proportion employed. By "plasticised resin" accordingly is meant the resin with plasticiser incorporated in it such that it meets this test requirement to provide a durable continuous non-tacky surface film.

Suitable plasticiser compounds for use with dextrin as resin are glucose, sucrose, glycerol, ethylene glycol and urea. Examples of plasticiser compounds which can be used with sodium lignosulphonates are glucose, sucrose, glycerol, ethylene glycol, urea and diethylene glycol monoethyl ether. While neither dextrin nor sodium lignosulphonate are satisfactory by themselves, mixtures of them, for instance containing from 10 to 90% dextrin and 90 to 10% sodium lignosulphonate by weight, can be employed, when the one acts as plasticiser for the other. In general the amount of plasticiser compound will be from 5 to 60% by weight of the plasticised resin. Some suitable ranges of resin-plasticiser compositions that can be used for the coating of plasticised resin are given in the following table.

| Resin | Plasticiser | Plasticiser in plasticised resin % |
|---|---|---|
| Yellow dextrin | Glucose | 35 - 60 |
| | Sucrose | 15 - 60 |
| | Urea | 10 - 50 |
| Sodium lignosulphate | Glucose | 10 - 35 |
| | Sucrose | 20 - 60 |
| | Urea | 10 - 50 |

A coating can contain finely-divided inert anhydrous inorganic material either dispersed through it or in a layer between two layers of coating. The coating can also contain water residual from an aqueous solution from which it has been applied, for instance up to 5% by weight.

The granule core of solid material can be any enzyme granule, for instance one of those well-known in the art of detergent compositions containing enzyme granules. The carrier material of the core will be of solid non-friable substance suitable for carrying the enzyme, for instance a water-soluble substance which can have detergent or detergency builder properties. Thus it can be a solid water-soluble inorganic salt, especially a detergency builder salt. Examples of suitable inorganic salts are sodium tripolyphosphate, sodium orthophosphate, sodium pyrophosphate, sodium hexametaphosphate, sodium carbonate, sodium silicate, sodium bicarbonate, sodium tetraborate, sodium perborate, and sodium sulphate. Potassium salts can also be used. Non-builder salts such as sodium chloride can also be employed. Preferably the carrier material of the core is sodium tripolyphosphate.

The enzyme carried on the granular core material can be any which it is desired to put into granular form. While this invention is described with particular reference to detergent compositions, the enzyme can be one whose practical use is intended to be other than as a detergent. It can for example be an oxidoreductase, transferase, desmolase or isomerase, and for detergent compositions a hydrolase is particularly useful. The most common classes of hydrolase are proteases, which degrade protein-containing soils; esterases, which degrade lipid-containing soils such as sebum; carbohydrases, for instance amylase, which degrade carbohydrates; and nucleases, which degrade nucleic acids present in skin residues. A typical protease used in detergent compositions is the subtilisin enzyme from *bacillus subtilis*. Many suitable proteases are available commercially, usually in fine powder form, the powder containing from 2 to 80% of active enzyme and inert diluent such as starch, sodium sulphate, calcium sulphate or sodium chloride, but sometimes in liquid form, for instance as a slurry. Other enzymes that can be used are described in Barman, *Enzyme Handbook*, Volumes I and II (Springer Verlag, 1969).

The granule core preferably contains a cohesive organic material as binder, the material either melting or dissolving in water at the temperature of use of the granule in order to release the enzyme. Examples of suitable cohesive organic materials are fatty acids containing from 8 to 30 carbon atoms, for instance lauric, palmitic and stearic acids, and fatty acids, coconut oil and tallow; fatty alcohols containing from 12 to 30 carbon atoms, for instance lauryl alcohol and the fatty alcohol derived from tallow; and monoglycerides and diglycerides, for instance 1-monostearin, 1,3-distearin, 1-monopalmitin and 1,3-dimyristin. Preferably the cohesive organic material is a nonionic detergent-active compound, particularly one which has a melting point within the range from 0° to 30° C, especially 15° to 25° C. Suitable nonionic detergent-active compounds are condensates of ethylene oxide with organic compounds having reactive hydrogen atoms, for instance a fatty acid of 8 to 18 carbon atoms, a fatty alcohol of from 8 to 24 carbon atoms, or an alkyl phenol whose alkyl group has from 5 to 18 carbon atoms, using from 5 to 50 mols ethylene oxide per mol of reactive hydrogen-containing compound. A nonionic detergent-active compound prepared by condensation of 9 mols ethylene oxide with 1 mol of a mixture of $C_{11}$ to $C_{15}$ secondary alkanols is particularly suitable.

The granule core can have a layer of cohesive organic material around its surface, or the solid material carrying the enzyme can be agglomerated with the cohesive organic material to form the core. Where cohesive organic material is present in a granule core it will usually provide from 2 to 50% by weight of the granule core. The amount of enzyme present in the granule core will be chosen according to the activity of the enzyme concentrate available.

The size of an individual granule core will generally be within the range of from 0.05 to 4 mm average diameter, and more often from 0.3 to 1.2 mm.

An effective amount of the plasticised resin coating can be from 2 to 50% of plasticised resin by weight of the granule, but the minimum amount required to give a worthwhile improvement can be even less, perhaps as little as 1% or even ½% where a granule has already been coated with other substances, for instance a nonionic detergent-active compound. Preferably the amount of plasticised resin coating is from 3 to 40%, and especially from 7 to 20%, by weight of the granule.

The preparation of a granule core can be carried out by conventional methods. Thus, an enzyme slurry containing cohesive organic material as binder can be sprayed on to granulated sodium tripolyphosphate in a mixer, or an enzyme powder can be mixed with the sodium tripolyphosphate and a concentrated solution of cohesive organic material sprayed on to it and the resulting mass extruded and formed into noodles.

The invention includes a process for preparing an enzyme granule as described above, which comprises contacting the granule core with an aqueous solution of the plasticised resin, and if necessary removing excess water, until a continuous film of solid plasticised resin is formed around the granule core. A mass of granular cores can be sprayed while it is continuously moved in a mixer.

Preferably the granule cores are sprayed with an aqueous solution containing an amount of the plasticised resin corresponding to a viscosity at the temperature of spray-formation of from 0.05 to 20, and preferably from 0.5 to 10 poises. In practice the solution contains not more than 50% by weight of water. Preferably the aqueous solution also contains a minor amount, for instance from 1 to 10% by weight, of a nonionic detergent-active compound such as those described above as cohesive organic materials, in order to assist the formation of spray. During the formation of the coating, the core is preferably contacted with a finely-divided inert anhydrous inorganic material, for instance silica or talc, in order to thicken the coating as it is formed: an effective amount will usually be no greater than the amount of plasticised resin employed. For this purpose the finely-divided inorganic material can be added simultaneously with spraying or during an interruption in the spraying step. The contacted granule core in some instances requires no positive step of drying either because sufficient water evaporates during the contacting process or is absorbed into the core, but if necessary to form a sufficiently dry coating, excess water is removed by drying, for instance in an air current with the granules in a state of motion of prevent adhesion.

The coating step can be carried out in a Lodige mixer, a pan coater, a drum granulator, or a smooth vertical cylinder having a rotating roughened base plate.

The invention also includes a solid detergent composition comprising enzyme granules as described above, where the enzyme is a hydrolase, and a detergent-active compound external to the granules. Such detergent compositions include fabric-washing compositions for use in pre-wash soak media and in a washing process. Examples of detergent compositions of the invention are those of British Pat. No. 1,204,123 or any of the conventional enzyme granule detergent compositions, whose enzyme granules are replaced by the coated enzyme granules of this invention. The detergent-active compound external to the granules can be anionic, nonionic, amphoteric or zwitterionic in character, and can be present with a detergency builder and other conventional detergent ingredients, for instance lather boosters, bleaching agents, antiredeposition agents, perfumes, fluorescers and colourants. Typical detergent-active compounds, builders and detergent compositions are described in Schwartz and Perry, *Surface Active Agents*, Volume I, (Interscience 1949), and Schwartz, Perry and Berch, *Surface Active Agents and Detergents*, Volume II (Interscience 1958). To prepare such detergent compositions, the enzyme granules of the invention can simply be mixed with a free-flowing detergent powder in the proportion required, usually from 1 to 25% by weight of the total composition.

The invention is illustrated by the following Examples, in which amounts are by weight and temperatures are in ° C. The yellow dextrin employed is a dextrin giving in 50% aqueous solution a liquid of viscosity 7 poises at 20°. The sodium lignosulphonate is one obtained by the sulphonation of lignin to introduce 4 sulphonic acid groups per lignin unit and subsequent neutralisation with caustic soda, and giving in 50% aqueous solution a liquid of viscosity 9 poises at 20°. The aqueous plasticised resin solutions used for coating granule cores have in each instance a viscosity within the range of 0.5 to 10 poises during spray formation.

EXAMPLES 1 TO 3

An enzyme slurry consisting of protease from *bacillus subtilis* with inorganic salts dispersed in a liquid condensate of 9 mols of ethylene oxide with 1 mol of a mixture of $C_{11}$, $C_{13}$ annd $C_{15}$ secondary alkanols (the slurry having a nominal enzyme activity of 1400 glycine units per mg or 1.9 Anson units per g) was atomised into non-friable porous granular sodium tripolyphosphate (of particles retained on a sieve of mesh diameter 0.5 mm and passing a sieve of mesh diameter 1.2 mm) at 30°–40° agitated in a Lodige mixer (a mixer having a drum with axially-rotated blades).

On to the granule cores thus produced was atomised an aqueous solution containing 45.5% yellow dextrin and 13.6% glucose, with continued agitation. The resulting granules were then dried for 20 minutes in a fluidised bed with air at 40°.

A detergent composition was prepared by mixing 5 parts of the granules with 95 parts of a detergent powder containing the following ingredients.

| | |
|---|---|
| Sodium dodecylbenzene sulphonate | 14 |
| Sodium soap (a mixture of sodium salts of the fatty acids of tallow and coconut oil in proportion 80:20) | 1 |
| Anhydrous alkaline sodium silicate ($Na_2O$:$SiO_2$ ratio 1:2) | 7 |
| Coconut monoethanolamide | 1 |
| Sodium tripolyphosphate | 27.5 |
| Sodium sulphate | 6.5 |
| Sodium carboxymethylcellulose | 0.5 |
| Sodium perborate | 25 |
| Water (with perfume and fluorescer) | 18.5 |

A 30g sample of detergent composition was elutriated for 10 minutes in a constant stream of air at a velocity of 0.3 metres per second, the air being exhausted through a fibreglass filter upon which all elutriated material was collected. The collected material was analysed for enzyme activity and the total enzyme loss from the sample thus determined.

Enzyme granules were prepared using different amounts of ingredients as given in the table below and detergent compositions prepared from them tested with the results given.

| Example No. | 1 | 2 | 3 |
|---|---|---|---|
| Granular sodium tripolyphosphate | 81 | 83 | 81.5 |
| Enzyme slurry | 10.1 | 10.3 | 8.2 |
| Aqueous solution of resin and plasticiser | 15.1 | 11.8 | 21.2 |
| Amount of coating in granule % | 9 | 7 | 12 |
| Elutriated enzyme in glycine units | 180 | 500 | 250 |

The average loss of enzyme from conventional enzyme granules in a similar detergent composition when subjected to the above test is 800-1000 glycine units.

EXAMPLES 4 AND 5

Enzyme granules were prepared as in Examples 1 to 3, except that the aqueous solution of yellow dextrin and glucose also contained 0.8 and 0.9%, respectively, of the same ethylene oxide-alkanol condensate that was present in the enzyme slurry, and no positive drying step was used; and detergent compositions were prepared and tested as before, with the following results.

| Example No. | 4 | 5 |
|---|---|---|
| Granular sodium tripolyphosphate | 77.4 | 75.5 |
| Enzyme slurry | 9.7 | 9.4 |
| Aqueous solution of resin and plasticiser | 21.8 | 25.4 |
| Amount of coating in granule % | 12.9 | 15 |
| Elutriated enzyme in glycine units | 20 | 10 |

EXAMPLES 6 AND 7

Enzyme granules were prepared as in Examples 1 to 3, except that the aqueous solution of resin and plasticiser was applied in two steps, and between these steps the partially-coated granule cores were contacted in the Lodige mixer with particles of a finely-divided alumina-silica powder obtained by the neutralisation of aqueous sodium silicate with aluminium chloride and having a ratio of $SiO_2$:$Al_2O_3$:$Na_2O$ of 30:2:1 and a particle size passing a sieve of mesh 50μ and no positive drying step was used: detergent compositions were prepared and tested as before, with the following results.

| Example No. | 6 | 7 |
|---|---|---|
| Granular sodium tripolyphosphate | 68 | 67 |
| Enzyme slurry | 8.6 | 8.4 |
| Aqueous solution of resin and plasticiser | | |
| in first step | 13.2 | 12.8 |
| in second step | 13.2 | 17.6 |
| Alumina silica powder | 6.9 | 6.7 |
| Amount of coating in granule % | 23 | 25 |
| Elutriated enzyme in glycine units | 90 | 80 |

EXAMPLES 8 AND 9

Granule cores were prepared as in Example 1 and given a preliminary coating by atomising on to them in the Lodige mixer a solution of anhydrous citric acid in the same ethylene oxide condensate as was present in the slurry (the solution containing 20% citric acid). The resulting granule cores were placed on a rough disc revolving at 350 rpm within stationary smooth vertical cylindrical walls and an aqueous solution containing 45.5% yellow dextrin and 13.6% glucose and also particles of the finely divided silica alumina composition of Examples 6 and 7 were slowly and simultaneously added to the cores. The granules produced were dried for 20 minutes in a fluidised bed with air at 40°.

A detergent composition was prepared by mixing 5 parts of the granules with 95 parts of the same detergent powder as in Examples 1 to 3 and subjected to the elutriation test.

A similar composition was prepared in which the glucose was replaced by urea.

The amounts of ingredients and results were as follows:

| Example No. | 8 | 9 |
|---|---|---|
| Granular sodium tripolyphosphate | 71 | 71 |
| Enzyme slurry | 9.4 | 9.4 |
| Solution of citric acid in ethylene oxide condensate | 6.1 | 6.1 |
| Aqueous solution of resin and plasticiser | 9.7 | 9.7 |
| Silica alumina | 7.8 | 7.8 |
| Amount of coating in granule % | 14 | 14 |
| Elutriated enzyme in glycine units | 0 | 10 |

EXAMPLE 10

Enzyme-carrying granule cores were prepared by extruding a plastic mass of a commercial protease concentrate derived from *bacillus subtilis*, sodium chloride, dextrin and water, through a metal screen to give noodles of 700μ diameter. The noodles were dropped on to a revolving rough disc to form spherical particles which are transferred to a fluidised bed drier where they were dried at 40°–60°. The dry granule cores were given a preliminary coating of nonionic detergent-active compound by a step similar to that described in Examples 8 9.

Granular cores prepared in this way were placed in a bed and fluidised with air at 60° and an aqueous solution of 45% yellow dextrin and 13.6% glucose in an amount which was 12% of the granular cores was atomised through a nozzle projecting into the fluidised bed to give granules having a coating of the dried plasticised resin. The granules (7% of which was coating) were than used to prepared detergent composition as in Examples 1 to 3.

EXAMPLES 11 TO 13

Granules are prepared by processes similar to those of preceding Examples, but using as plasticiser in the aqueous solution of resin and plasticiser, instead of glucose, the compounds indicated and in the amounts given, the remainder of the compositions and the procedure being as given in the Examples indicated.

| Example No. | Composition and process of previous Example No. | Plasticiser | Concentration of plasticiser in aqueous solution |
|---|---|---|---|
| 11 | 1 | Sucrose | 20% |
| 12 | 4 | Glycerol | 10% |
| 13 | 6 | Ethylene glycol | 20% |

Detergent compositions are prepared from the granules as in Example 1.

EXAMPLES 14 TO 19

Granules are prepared by processes similar to those of preceding Examples, but using in the aqueous solution of resin and plasticiser, instead of yellow dextrin, sodium lignosulphonate in the same concentration and with various plasticisers and in the amounts given, the remainder of the compositions and the procedure being as given in the Examples indicated.

| Example No. | Composition and process of previous Example No. | Plasticiser | Concentration of plasticiser in aqueous solution |
|---|---|---|---|
| 14 | 2 | Urea | 20% |
| 15 | 5 | Glucose | 15% |
| 16 | 7 | Sucrose | 20% |
| 17 | 8 | Glycerol | 10% |
| 18 | 9 | Ethylene glycol | 10% |
| 19 | 1 | Diethylene glycol ethyl ether | 8% |

Detergent compositions are prepared from the granules as in Example 1.

EXAMPLE 20

Granules are prepared by a process similar to that of Example 1, but using in the aqueous solution of resin and plasticiser instead of yellow dextrin and glucose an aqueous solution containing 11.5% yellow dextrin and 38.5% sodium lignosulphonate.

A detergent composition is prepared from the granules as in Example 1.

What is claimed is:

1. An enzyme granule comprising a granule core of solid material carrying an enzyme, said granule having around it a continuous, non-tacky solid coating of plasticised resin substantially free of the enzyme, the resin being selected from the group consisting of dextrin and alkali metal liguosulphonate and having at 20° C and at a neutral pH, a solubility in water of at least 50% by weight, and a 50% aqueous solution of the resin at 20° C having a viscosity of from 0.1 to 25 poises.

2. A granule according to claim 1, in which the plasticised resin comprises dextrin and an effective amount of glucose, sucrose, urea, glycerol or ethylene glycol to plasticise the dextrin.

3. A granule according to claim 1, in which the plasticised resin comprises sodium lignosulphonate and an effective amount of glucose, sucrose, urea, glycerol, ethylene glycol or diethylene glycol monoethyl ether to plasticise the sodium lignosulphonate.

4. A granule according to claim 1, in which the plasticised resin is a mixture of from 10 to 90% dextrin and from 90 to 10% sodium lignosulphonate by weight.

5. A granule according to claim 1, in which the carrier material comprises a detergency builder.

6. A granule according to claim 5, in which the detergency builder is sodium tripolyphosphate.

7. A granule according to claim 5, in which the granule core contains as binder a nonionic detergent-active ethylene oxide condensate.

8. A granule according to claim 5, in which the enzyme is a hydrolase.

9. A process for preparing a granule as claimed in claim 1, comprising contacting a granule core of solid material carrying an enzyme with an aqueous solution of the plasticised resin and removing any excess water by drying until a continuous film of solid plasticised resin is formed around the granule core.

10. A process according to claim 9, in which the granule core is contacted by spraying with an aqueous solution containing an amount of the plasticised resin corresponding to a viscosity at the temperature of spray formation of from 0.5 to 20 poises.

11. A process according to claim 10, in which during the formation of the coating the core is contacted with a finely-divided inert anhydrous inorganic material.

* * * * *